United States Patent [19]
Higuchi

[11] 3,803,454
[45] Apr. 9, 1974

[54] PROTECTING DEVICE FOR ELECTRIC CAR

[75] Inventor: Toru Higuchi, Katsuta, Japan

[73] Assignee: Hitachi, Ltd., Tokyo, Japan

[22] Filed: Oct. 10, 1972

[21] Appl. No.: 296,022

[30] Foreign Application Priority Data
Nov. 12, 1971 Japan.............................. 46-90797

[52] U.S. Cl............. 317/13 R, 307/240, 317/33 SC
[51] Int. Cl. ........................................... H02h 7/20
[58] Field of Search........ 317/13 R, 33 SC; 307/240

[56] References Cited
UNITED STATES PATENTS

| | | | |
|---|---|---|---|
| 3,405,321 | 10/1968 | Staples............................ | 317/33 SC |
| 3,449,635 | 6/1969 | Staples............................ | 317/33 SC |
| 3,465,207 | 9/1969 | Merdian.......................... | 317/33 SC |
| 3,496,415 | 2/1970 | Ruthenberg..................... | 317/33 SC |

*Primary Examiner*—James D. Trammell
*Attorney, Agent, or Firm*—Craig and Antonelli

[57] ABSTRACT

A device for protecting an electric car from an overcurrent flowing in a main electrical circuit of the car in which a current detector is connected in series with a thyristor chopper which controls an electric motor, and the output signal of the detector and a conduction instruction signal for the thyristor chopper are applied to a logical discriminator for detecting failure of a commutation by the thyristor chopper. The detected signal is applied to the gate of a thyristor switch to energize a trip coil of a high-speed circuit breaker connected in series with the thyristor switch for interrupting the flow of motor current by the high-speed circuit breaker.

8 Claims, 14 Drawing Figures

FIG. IA
PRIOR ART
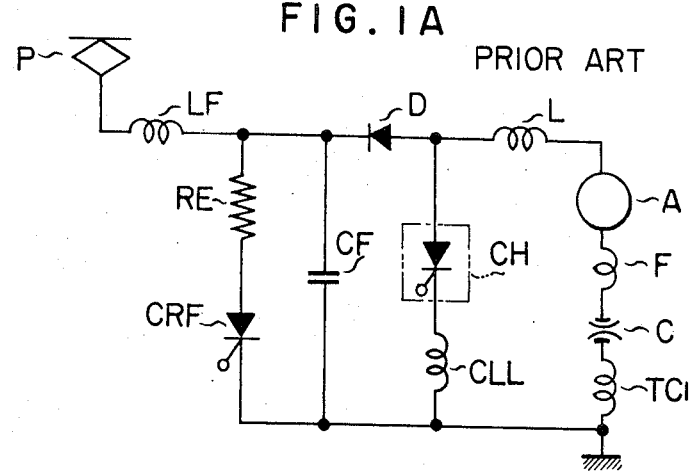
FIG. IB
PRIOR ART
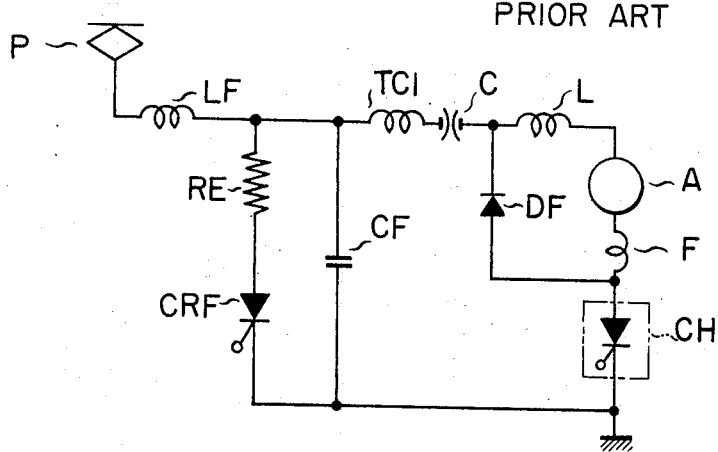

PROTECTING DEVICE FOR ELECTRIC CAR

This invention relates to improvements in a device for protecting electric cars. More particularly, this invention relates to a device for protecting a main circuit in an electric car employing a thyristor chopper and to improvements in the means for suppressing an undesirable increase in the motor current which increases when the thyristor chopper fails to make commutation.

In prior art devices for protecting electric cars, a current limiting reactor is interposed in a regenerative braking circuit and a smoothing reactor having a larger capacity than that required is disposed in a power running circuit for suppressing an undesirable increase in the motor current. However, the prior art protective device has an excessively large size which is unsuitable for mounting on an electric car.

It is a primary object of the present invention to provide an improved protective device which includes a current limiting reactor and a smoothing reactor of smaller capacity than heretofore thereby providing a protecting means which is small in size and inexpensive so that it can be conveniently mounted on an electric car.

In accordance with the present invention, there is provided a device for protecting an electric car comprising at least one electric motor, a thyristor chopper means for controlling said motor, a circuit breaker for interrupting the flow of current through said motor, means for detecting failure of commutation by said thyristor chopper means, and means for tripping said circuit breaker in response to the application of a signal from said failure detecting means.

In the present invention, the failure of commutation by the thyristor chopper which controls the operation of the motor is instantaneously detected and the flow of motor current is interrupted by the high-speed circuit breaker.

Other objects, features and advantages of the present invention will be apparent from the following description taken in conjunction with the accompanying drawing, in which:

FIGS. 1A and 1B are circuit diagrams of a regenerative braking main circuit and a power running control main circuit respectively in an electric car provided with a prior art protective device;

Figure 2:
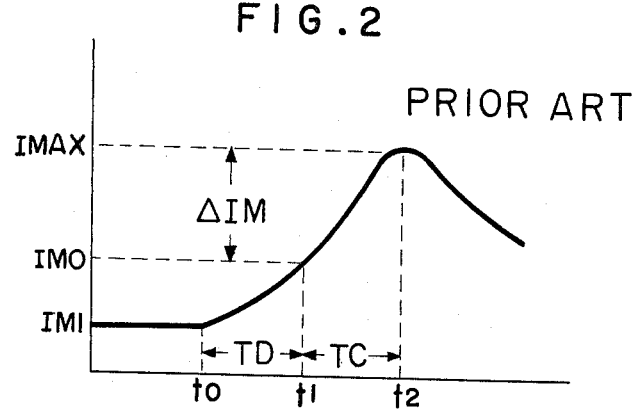
FIG. 2 is a graph illustrating the operation of the prior art regenerative braking main circuit showin in FIG. 1A.

The present invention is concerned with a protective device for a main circuit in an electric car employing a thyristor chopper, and in the description which follows, the operation of the circuit under regenerative braking will be described at first and the operation under power running control will then be described for convenience of explanation.

A current limiting reactor is generally interposed in a regenerative brake control device for a main circuit in an electric car in order to suppress an excessively large current which occurs when a thyristor chopper fails to make commutation during application of regenerative braking to the motor rotating at a high speed. This current limiting reactor is entirely useless when the thyristor chopper is normally operating and is desirably eliminated from the viewpoint of the cost, weight and size thereof.

The present invention contemplates, in the first place, the elimination of such a reactor. A prior art regenerative braking main circuit will be described with reference to FIG. 1A so that the present invention can be easily understood.

Referring to FIG. 1A, the prior art regenerative braking main circuit includes a pantograph P, a regenerative diode D, a smoothing reactor L, an armature A and a field winding F of a motor, a high-speed circuit breaker C, a trip coil TC1 of the circuit breaker C, a thyristor chopper CH, a current limiting reactor CLL, a filter reactor LF, a filter condenser CF, a discharging resistor RE for the filter condenser CF, and a thyristor switch CRF for discharging the charge stored in the filter condenser CF. In response to the conduction of the thyristor chopper CH in such a circuit, the voltage induced in the armature A of the motor by the residual magnetic flux causes flow of current through the field winding F with the result that the magnetic flux is increased to increase the generated voltage. This self-excitation acts to increase the current flowing through the circuit which is traced from the armature A — smoothing reactor L — thyristor chopper CH — current limiting reactor CLL — trip coil TC1 — high-speed circuit breaker C — field winding F to the armature A. The thyristor chopper CH is rendered non-conducting when the current flowing through this circuit attains a predetermined level, and no current flows now through the thyristor chopper CH. However, due to the electromagnetic energy stored in the internal inductance of the smoothing reactor L and the armature A and field winding F of the motor, the current having passed through the smoothing reactor L is regeneratively supplied to the trolley wire through the regenerative diode D and pantograph P.

In regenerative braking utilizing the thyristor chopper, the voltage $E_M$ induced in the armature A of the motor is required to be always lower than the trolley wire voltage $E_S$. This is beacuse, if $E_M$ is greater than $E_S$, the self-excitation causes an increase in the regenerated current and gives rise to overcurrent trouble regardless of whether the thyristor chopper CH is conducting or non-conducting.

Consider now the case in which the thyristor chopper CH is kept in the conducting state for some reason and cannot be stored to the non-conducting state. When thus the thyristor chopper CH fails to make commutation, the armature current of the motor becomes excessively large due to the self-excitation above described. In the course of the excessive increase in the armature current, troubles such as mal-commutation, shorting sparks and buring of the motor may occur and the thyristor chopper CH may also be damaged due to the excessively large current. The high-speed circuit breaker C is provided for preventing such troubles. The overcurrent detector or trip coil TC1 of the high-speed circuit detector C is set to operate at a current value IM0 which is slightly greater than the maximum current IM1 appearing during the normal operation so that, as soon as the armature current of the motor reaches the setting IM0, the high-speed circuit breaker C can be actuated to break the circuit to reduce the armature current of the motor before the overcurrent trouble occurs.

Variations in the current value until the circuit is opened by the circuit breaker C after failure of commutation in the prior art circuit will be described with reference to FIG. 2. Suppose now that the regenerative brake is applied at the current value IM1 and failure of commutation occurs at time $t_0$. In this case, the current IM is increased until it attains the setting IM0 of the trip coil TC1 at time $t_1$ in a period of time TD after $t_0$. At this time $t_1$, the high-speed circuit breaker C starts the circuit breaking operation, and at time $t_2$ in a period of time TC after $t_1$, the contacts of the circuit breaker C start to part from each other so that the current value starts to decrease. In other words, the current value would not start to decrease until time $t_2$ is reached which is later by the period of time TC from time $t_1$. The period of time TC required for breaking operation is substantially constant, and the higher the speed of the motor at which the failure of commutation occurs, the greater is the counter-electromotive force. Therefore, the maximum current value IMAX exceeds the setting IM0 by a correspondingly greater amount IM. Since the increase in the maximum current value IMAX gives rise to damage to the equipment, the current limiting reactor CLL is provided as seen in FIG. 1A in order to limit the maximum current value IMAX even in the event of occurrence of failure of commutation during running of the electric car at a practical high speed. This current limiting reactor CLL may be replaced by a resistor.

The power running control operation will next be described with reference to FIG. 1B which shows the main circuit in the electric car during the power running control. In this main circuit, the symbol DF designates a freewheel diode and the same symbols are used to designate the same parts shown in FIG. 1A. If the thyristor chopper CH fails to make commutation during the power running control, the thyristor chopper CH remains in the conducting state and the armature current of the motor is increased. When the value of the armature current of the motor attains a predetermined level, the high-speed circuit breaker C is tripped by the actuating force of the trip coil TC1 for interrupting the flow of the armature current of the motor. The smoothing reactor L in this circuit has a capacity larger than is required in order to suppress the undesirable increase in the motor armature current.

The present invention is intended to eliminate the current limiting reactor CLL from the regenerative braking main circuit or reduce the capacity of the current limiting reactor CLL. The present invention is further intended to reduce the capacity of the smoothing reactor L in the power running control main circuit. Furthermore, the present invention is intended to more reliably protect the main circuit in the electric car by quickly breaking the main circuit in the event of failure of commutation by the thyristor chopper CH in spite of the elimination of or reduction in the capacity of the current limiting reactor and the reduction in the capacity of the smoothing reactor.

Figure 3A:
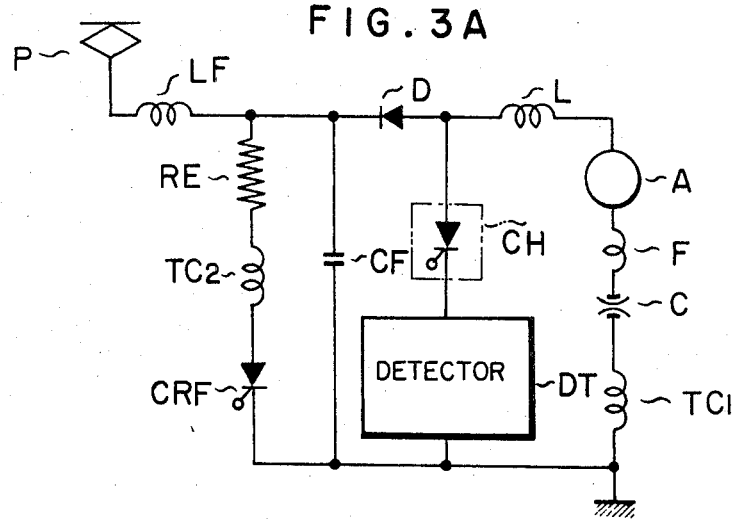
FIGS. 3A and 3B are circuit diagrams of a regenerative braking main circuit and a power running control main circuit respectively in an electric car provided with an improved protective device according to the present invention.

FIG. 3A shows a regenerative braking main circuit embodying the present invention, and like symbols are used to denote like parts appearing in FIG. 1A. The circuit shown in FIG. 3A differs from the circuit shown in FIG. 1A in that a thyristor chopper conduction current detector DT is provided to replace the current limiting reactor CLL and a second trip coil TC2 of a high-speed circuit breaker C is connected in series between a discharging resistor RE and a thyristor switch CRF. This thyristor chopper conduction current detector DT acts to continuously monitor the current flowing through a thyristor chopper CH and delivers a signal indicative of conduction of the thyristor chopper CH when the current flows through the thyristor chopper CH. This conduction indicative signal and a conduction instruction signal for the thyristor chopper CH are subjected to logical discrimination for the detection of failure of commutation by the thyristor chopper CH. A signal indicative of failure of commutation is applied to the gate of the thyristor switch CRF for firing the thyristor switch CRF so that the second trip coil TC2 of the high-speed circuit breaker C connected in series with the thyristor switch CRF is energized to trip the circuit breaker C.

Figure 4:
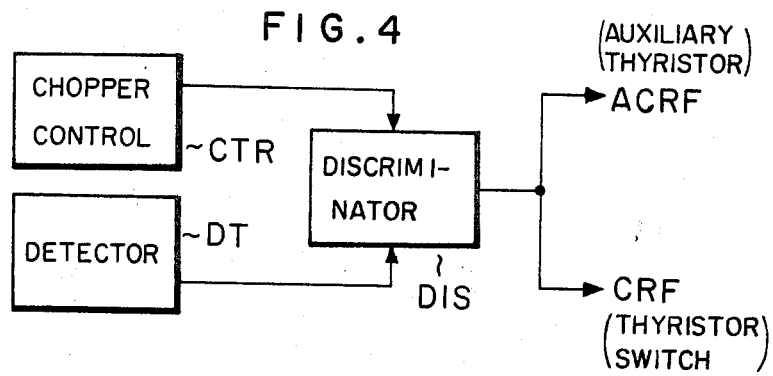
FIG. 4 is a block diagram of a circuit for detecting failure of commutation by the thyristor chopper.

FIG. 4 is a block diagram of a circuit for detecting the failure of commutation by the thyristor chopper CH. The conduction instruction signal is applied from a control means CTR for the thyristor chopper CH to a discriminator DIS, and the conduction indicative signal is also applied to the discriminator DIS from the thyristor chopper conduction current detector DT. When the thyristor chopper CH is normally operating, the conduction instruction signal and the conduction indicative signal are simultaneously applied to the discriminator DIS, while when the thyristor chopper CH fails to make commutation, the conduction indicative signal is solely applied to the discriminator DIS in spite of the fact that the conduction instruction signal disappears and is not applied thereto. In this latter case, the failure of commutation is detected by the discriminator DIS and a signal indicative of the failure is applied from the discriminator DIS to the thyristor switch CRF. An EXCLUSIVELY-OR circuit can most simply carry out this kind of logical discrimination.

It will be understood from the above description that the contact parting operation (breaking operation) of the high-speed circuit breaker C takes place substantially simultaneously with the occurrence of the failure of commutation by the thyristor chopper CH. In the prior art circuit, a considerably long period of time TD is required until the current value increasing as a result of failure of commutation attains the setting IM0 of the trip coil. The present invention can shorten the period of time corresponding to TD. This means the fact that the rate dIM/dt of the increase in the overcurrent IM relative to time can be increased provided that the maximum allowable overcurrent value is constant.

Therefore, the circuit may have a smaller inductance, and the current limiting reactor CLL essentially required in the prior art circuit can be eliminated or its capacity can be decreased according to the present invention.

Figure 3B:
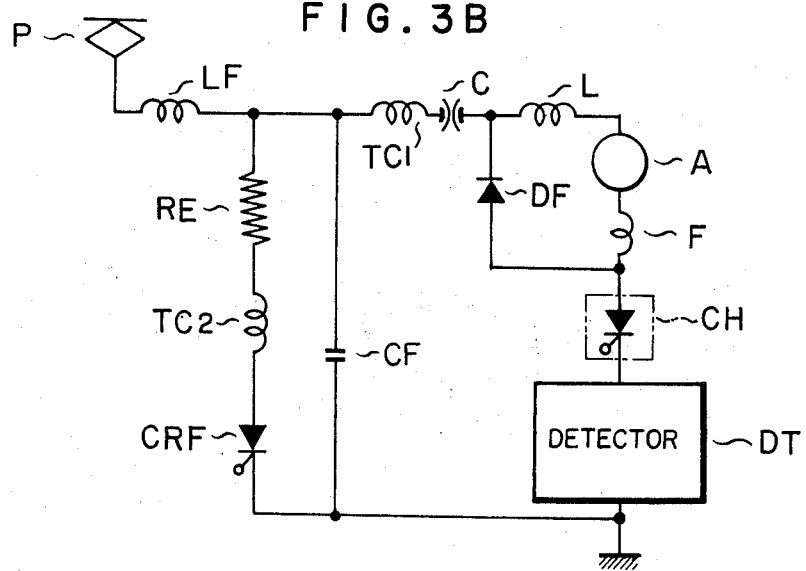

FIG. 3B shows a power running control main circuit according to the present invention, and like symbols are used to denote like parts appearing in FIG. 1B. The circuit shown in FIG. 3B differs from the circuit shown in FIG. 1B in that the conduction current detector DT is connected to the thyristor chopper CH, the second trip coil TC2 of the high-speed circuit breaker C is connected in series between the discharging resistor RE and the thyristor switch CRF, and the smoothing reactor L has a reduced capacity. In the circuit shown in FIG. 3B, a signal indicative of failure of commutation appears in the event of failure of commutation by the thyristor chopper CH and is applied to the gate of the thyristor switch CRF to fire the same thereby energizing the second trip coil TC2 for tripping the high-speed circuit breaker C. In the prior art circuit, the smoothing reactor L is designed to have a capacity larger than is required in order that it can exhibit the desired effect for suppressing the undesirable increase in the armature current due to occurrence of trouble. According to the present invention, the smoothing reactor L for current suppression may have a smaller capacity than heretofore and overcurrent trouble can be quickly eliminated due to the fact that the motor armature current can be cut off as soon as the thyristor chopper CH fails to properly operate.

Figure 5:
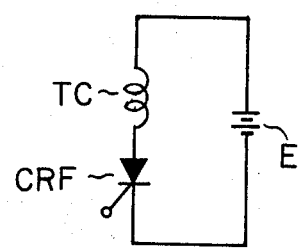
FIG. 5 is a circuit diagram of a circuit for amplifying a signal indicative of failure of commutation thereby energizing a trip coil of the circuit breaker.

FIG. 5 shows an arrangement in which the second trip coil TC2 of the high-speed circuit breaker C is disposed independently of the main circuit in the electric car. In FIG. 5, the signal indicative of failure of commutation by the thyristor chopper CH is applied to another thyristor switch CRF, and the trip coil TC2 is energized by an independent power source.

Figure 6A:
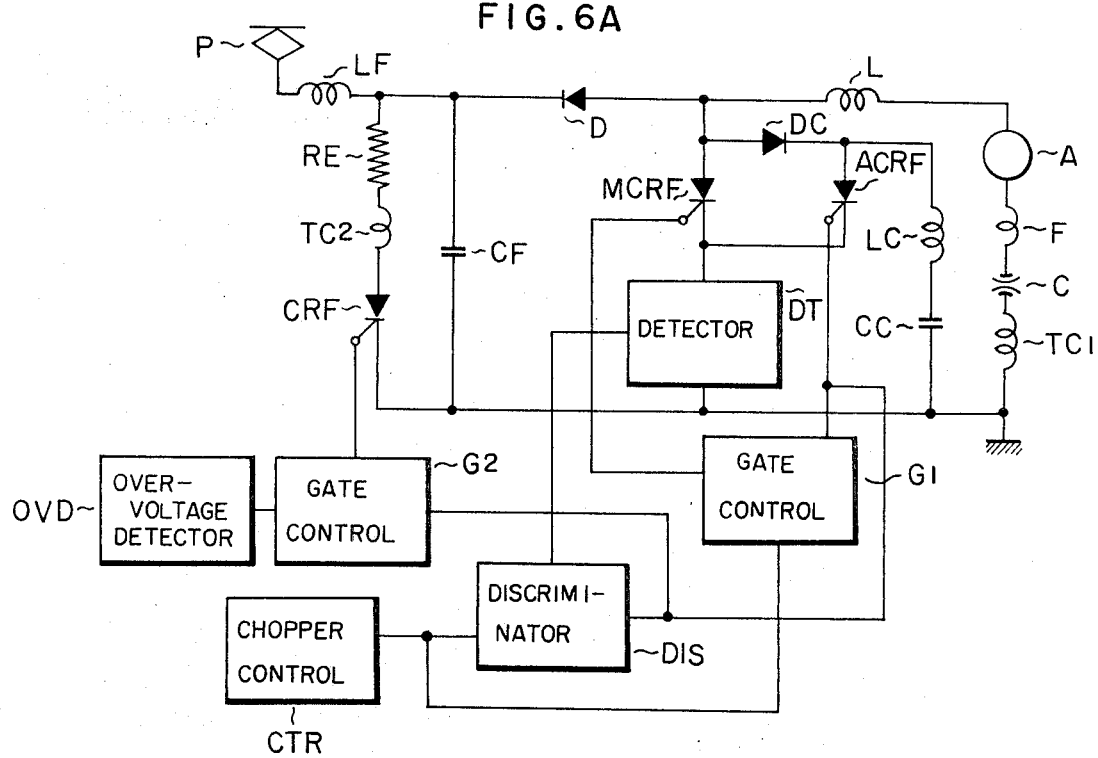
FIGS. 6A and 6B are circuit diagrams showing in detail the structure of the regenerative braking main circuit and power running control main circuit shown in FIGS. 3A and 3B respectively.
Figure 6B:
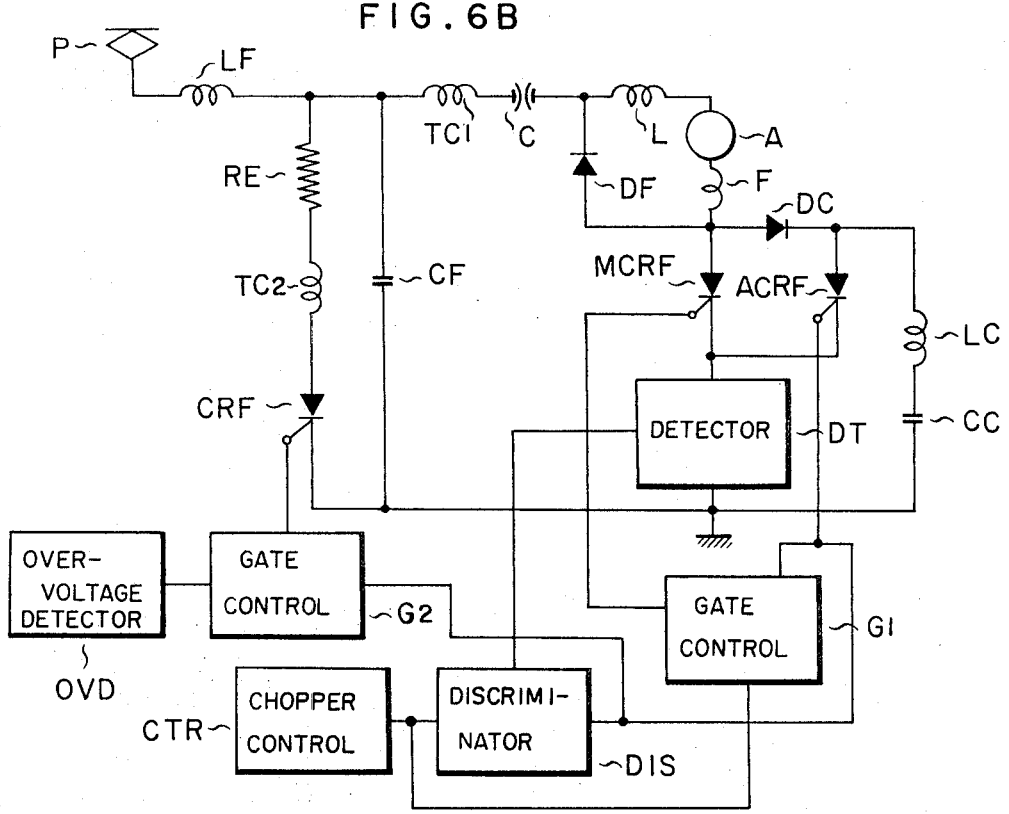

FIGS. 6A and 6B show in detail the structure of the main circuit portions including the thyristor chopper CH shown in FIGS. 3A and 3B, and show also the arrangement of control means for the thyristor chopper CH and control means for preventing application of an overvoltage across the filter condenser CF. Referring to FIGS. 6A and 6B, an auxiliary thyristor ACRF is connected at the anode thereof to the anode of a main thyristor MCRF through a commutating diode DC and to the thyristor conduction current detector DT through a commutating reactor LC and a commutating condenser CC. A gate control means G1 is connected to the gate of the main and auxiliary thyristors MCRF and ACRF. An overvoltage detector OVD is provided to detect an overvoltage across the filter condenser CF and is connected to a gate control means G2 for the thyristor switch CRF. The control means CTR for the thyristor chopper CH is connected to the discriminator or commutation failure detector DIS. In this circuit, the signal indicative of failure of commutation by the thyristor chopper CH is applied to the auxiliary thyristor ACRF beside the thyristor switch CRF for the reason which will be described below. Although only one main thyristor MCRF is shown in FIGS. 6A and 6B, a plurality of such thyristors are actually connected in parallel. When anyone of the main thyristors fails to make commutation, the entire load current will be concentrated on this failing thyristor and thermal breakdown of this thyristor may result. To avoid this trouble, the auxiliary thyristor ACRF is fired to carry out the commutating operation again thereby cutting off the failing thyristor as soon as possible.

Figure 7A:
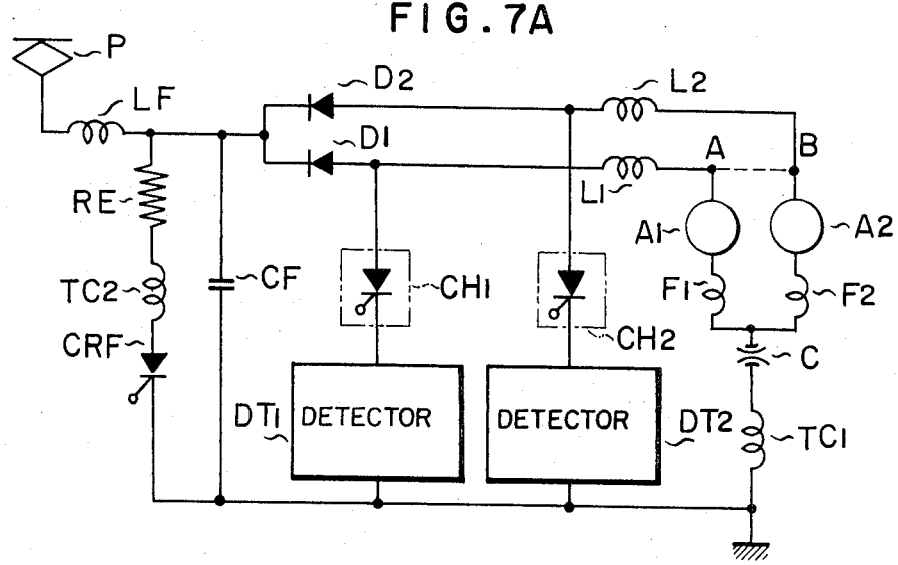
FIGS. 7A and 7B are circuit diagrams of a regenerative braking main circuit and a power running control main circuit respectively showing another embodiment of the present invention in which two-phase thyristor choppers are employed.
Figure 7B:
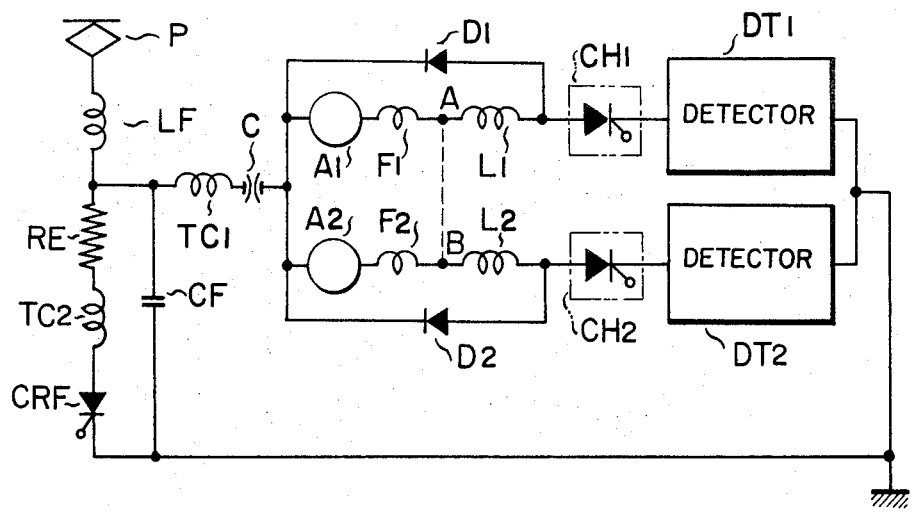

FIGS. 7A and 7B show an application of the present invention to a two-phase thyristor chopper device which is the simplest in structure among various poly-phase thyristor chopper devices. In FIGS. 7A and 7B showing a regenerative braking main circuit and a power running control main circuit respectively, thyristor choppers CH1 and CH2 of different phase are connected to respective thyristor chopper conduction current detectors DT1 and DT2. When the points A and B in the circuit are connected to each other, the thyristor chopper device acts as a two-phase double thyristor chopper device.

Figure 8A:
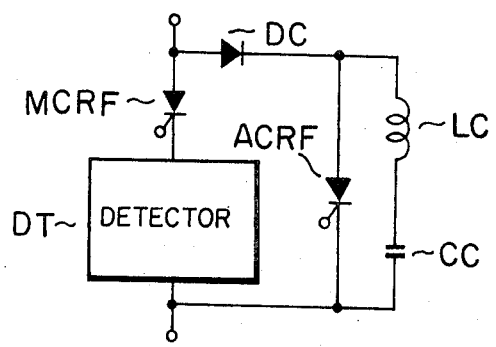
FIGS. 8A, 8B and 8C are circuit diagrams of various arrangements for detecting the current flowing through the thyristor or thyristors.
Figure 8B:
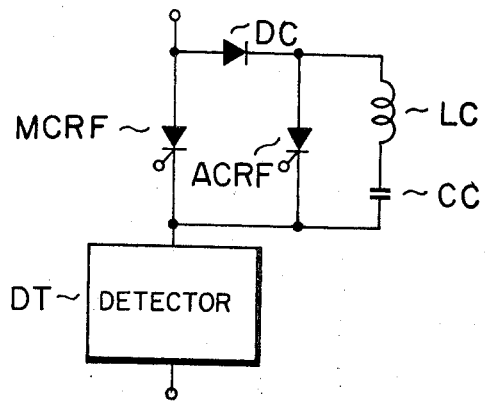
Figure 8C:
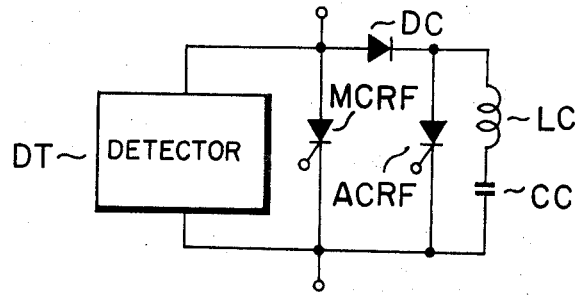

FIGS. 8A, 8B and 8C show the relative positions of the thyristor chopper CH and the thyristor chopper conduction current detector DT in FIGS. 6A and 6B. In FIG. 8A, the detector DT is disposed for detecting the conduction current of the main thyristor MCRF. In FIG. 8B, the detector DT is disposed for detecting the conduction current of the main and auxiliary thyristors MCRF and ACRF. In FIG. 8C, the detector DT is disposed for detecting the voltage across the anode and cathode of the main and auxiliary thyristors MCRF and ACRF thereby detecting the presence or absence of the conduction current.

What is claimed is:

1. A device for protecting an electric car comprising at least one electric motor, a thyristor chopper means for controlling said motor, a circuit breaker for interrupting the flow of current through said motor, means for detecting failure of commutation by said thyristor chopper means on the basis of logical discrimination between a conduction instruction signal for said thyristor chopper means and a signal indicative of conduction of said thyristor chopper means, and means for tripping said circuit breaker in response to the application of a signal from said failure detecting means.

2. A protective device as claimed in claim 1, wherein said circuit breaker tripping means includes a trip coil of said circuit breaker connected in series with a thyristor switch and the signal indicative of failure of commutation by said thyristor chopper means is applied to said thyristor switch.

3. A protective device as claimed in claim 1, wherein said circuit breaker tripping means includes a trip coil of said circuit breaker connected in series with a series circuit of a discharging resistor and a thyristor switch in the main circuit in the electric car.

4. A protective device as claimed in claim 1, wherein additional means is provided so as to carry out the commutating operation again in response to the application of the signal indicative of failure of commutation by said thyristor chopper means.

5. A protective device as claimed in claim 1, wherein said thyristor chopper means controlling said motor is a poly-phase chopper means including a plurality of thyristor choppers connected in parallel, and said circuit breaker is tripped in response to the appearance of the signal indicative of failure of commutation by any one of said thyristor choppers.

6. A protective device as claimed in claim 1, wherein said signal indicative of conduction of said thyristor chopper means is delivered from a conduction current detector connected in series with a main thyristor in said thyristor chopper means.

7. A protective device as claimed in claim 1, wherein said signal indicative of conduction of said thyristor chopper means is delivered from a conduction current detector connected in series with said thyristor chopper means.

8. A protective device as claimed in claim 1, wherein said signal indicative of conduction of said thyristor chopper means is delivered from a voltage detector connected in parallel with said thyristor chopper means.

* * * * *